United States Patent
Amini

[19]
[11] Patent Number: 5,879,543
[45] Date of Patent: *Mar. 9, 1999

[54] FILTER AND DEHYDRATOR APPARATUS WITH THREADED COLLAR

[76] Inventor: Bijan Amini, 4 Leaf Towers, #131, 5110 San Felipe, Houston, Tex. 77056

[*] Notice: The terminal 12 months of this patent has been disclaimed.

[21] Appl. No.: 227,287

[22] Filed: Apr. 13, 1994

[51] Int. Cl.⁶ .............................. B01D 29/88; B01D 35/30
[52] U.S. Cl. ............................ 210/86; 210/114; 210/232; 210/313; 210/440
[58] Field of Search ................................ 210/86, 96.1, 97, 210/114, 171, 232, 312, 313, 440, 441, 437, 443, 444, 445, 450, 456, 457, 416.4, DIG. 17, 416.5, 85, 299

[56] References Cited

U.S. PATENT DOCUMENTS

| | | | |
|---|---|---|---|
| 2,413,769 | 1/1947 | Kasten | 210/440 |
| 2,471,069 | 5/1949 | Le Clair | 210/313 |
| 4,264,442 | 4/1981 | Jackson | 210/86 |
| 4,276,161 | 6/1981 | Matsui et al. | 210/86 |
| 4,321,136 | 3/1982 | Matsui | 210/86 |
| 4,470,301 | 9/1984 | Hutchins et al. | 210/114 |
| 4,522,712 | 6/1985 | Fisher et al. | 210/440 |
| 4,637,351 | 1/1987 | Pakula | 210/313 |
| 5,078,901 | 1/1992 | Sparrow | 210/114 |
| 5,213,682 | 5/1993 | Richardson | 210/440 |

*Primary Examiner*—Joseph W. Drodge
*Attorney, Agent, or Firm*—Alton W. Payne

[57] ABSTRACT

An environmentally safe and compatible filter and dehydrator apparatus for dehydrating and filtering impurities from fuel materials having a filter housing, a filter element composed of non-metallic, environmentally safe material and a water sensor used to detect the presence of water and generate a signal in response thereto to automatically engage a pump to remove a quantity of separated water from the filter housing, in the absence of allowing air to enter the filter housing. While processing fuel through the filter housing, a natural fuel/water contact forms within a lower portion of the filter housing. As fuel material is filtered and the fuel/water contact rises within the filter housing, the fuel/water contact approaches the water sensor. When the water sensing means detects the presence of water, the water sensor generates a signal to engage a pump to remove a quantity of separated water from a lower opening in the lower portion of the filter housing. The separated water is automatically removed in the absence of allowing air to enter the filter housing and the fuel/water contact is kept at a minimum elevation within the filter housing and away from the filter element.

1 Claim, 4 Drawing Sheets

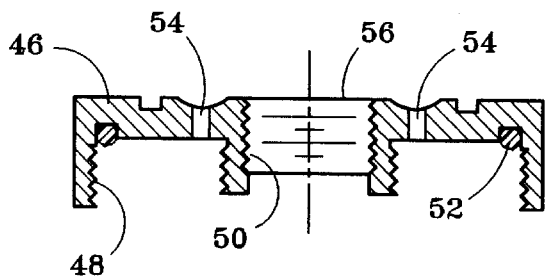
FIG.4b
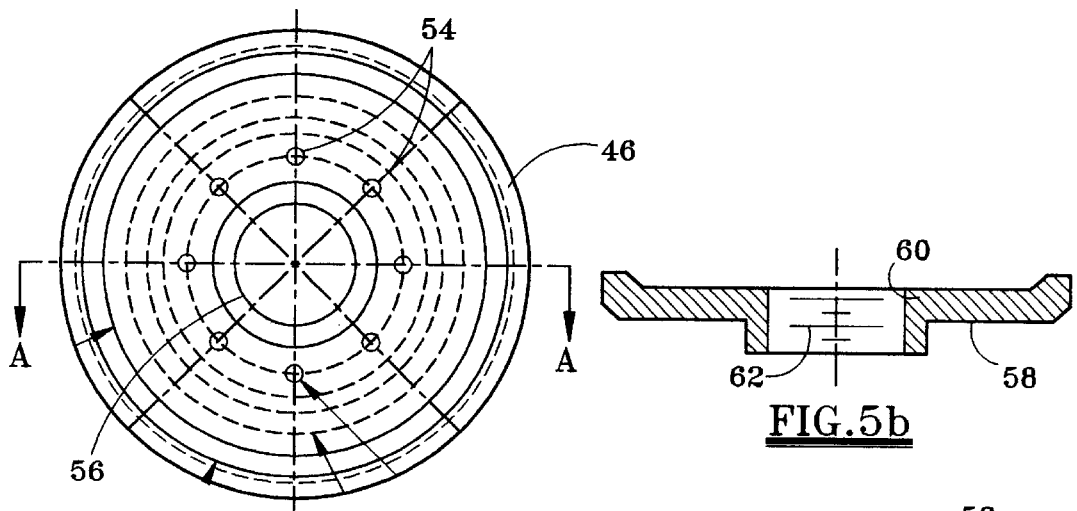
FIG.4a
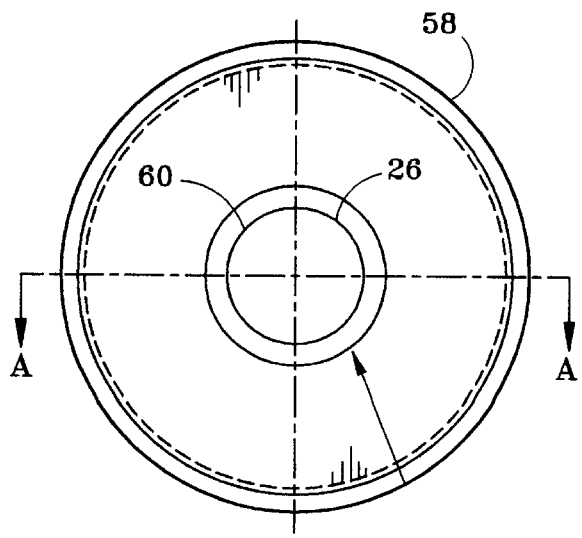
FIG.5b
FIG.5a

FILTER AND DEHYDRATOR APPARATUS WITH THREADED COLLAR

FIELD OF THE INVENTION

The present invention relates generally to an environmentally safe filter and dehydrator apparatus for dehydrating and separating impurities from non-water based fluids and having all disposable parts environmentally compatible. Specifically, the present invention relates to a filter and dehydrator apparatus for dehydrating and separating impurities from diesel fuel, and the like wherein a water sensing means is employed to automatically engage a pump means to remove a quantity of water from the filter and dehydrator apparatus such that water is replaced by fuel.

BACKGROUND OF THE INVENTION

The filtration of fuels, and the like, to remove water and other impurities is an ongoing concern. The -consumption of fuels which contain water and other impurities result in numerous problems including inefficient fuel consumption such as increased or accelerated consumption, impeded engine performance and even total engine failure. The consumption of hydrated and contaminated fuels is costly in terms of the associated engine repair and decrease in engine performance, the loss of productivity while the engine is being repaired and the backlog of work created while the vehicle is out of service.

The particular industries and activities which are directly affected by fuel consumption in internal combustion engines include trucking companies, bus companies, cab companies, delivery and courier companies, government emergency services and vehicle commuters. These industries and activities are particularly vulnerable to the maladies caused by consumption of hydrated and otherwise contaminated fuels. At this time, no environmentally safe device exists which separates impurities from fuels while also dehydrating the fuel and automatically disposing of the removed water from the filter apparatus.

Of primary concern in the present invention is to harmonize an efficient fuel filtration and dehydration apparatus having a filter element composed of environmentally safe, non-metallic materials and a water sensing means which generates a signal to activate a pump to automatically dispose of the removed water. The inclusion of a filter element made of disposable and environmentally safe materials eliminates the added expense of separating out the non-environmentally safe materials, permitting the expended filter elements to be used for plastics and cogeneration fuel applications. Additionally, the inclusion of a pump to remove the separated water from the filter and dehydrator apparatus generally provides that the water removed from the apparatus is replaced by fuel drawn from the fuel tank, thus generally preventing the entry of air into the apparatus.

It is, therefore, a feature of the present invention to provide a filter and dehydrator apparatus which in normal use dehydrates and separates impurities from fuels, using an environmentally safe filter element, while automatically removing and disposing of the separated water in the absence of allowing air to enter the apparatus.

Additional features and advantages of the invention will be set forth in part in the description which follows, and in part will become apparent from the description or maybe learned by practice of the invention. The features and advantages of the invention maybe realized by means of the combinations and steps particularly pointed out in the appended claim.

SUMMARY OF THE INVENTION

To achieve the foregoing objects, features and advantages and in accordance with the purpose of the invention as embodied and broadly described herein, a filter and dehydrator apparatus is provided for dehydrating and separating impurities from fuels and the like wherein, the removed water from the fuel is automatically removed from the apparatus.

Preferably, the filter and dehydrator apparatus is comprised of a filter housing having an internal compartment, a first upper opening and a second lower opening. The filter and dehydrator apparatus also includes a filter element, which is longitudinally inserted within the filter housing. The filter element is preferably comprised of disposable and environmentally safe, non-metallic materials, for example a celluous silicone treated paper or similar type material which may be available for plastics and cogeneration fuel usage. The filter element has a top portion and a bottom portion and preferably includes a continuous, concentric longitudinal bore extending from the top portion to the bottom portion. The bottom portion of the filter element is supported by a bottom filter support which is laterally affixed within the filter housing for contact with the bottom portion of the filter element. A top filter support is laterally affixed within the filter housing and secures the top portion of the filter element. A filter cap is fixedly attached to the filter housing adjacent to the first opening and includes an outwardly facing set of fastening threads to engage opposed mating surfaces. An internal filter collar is threadably attached to the fastening threads of the filter cap. The internal filter collar includes a plurality of longitudinal passages which facilitate the ingress of fuel into the filter housing. Fuel enters through the passages in the internal filter collar and flows downward and around the top filter support and fills the internal compartment of the filter housing. Due to the density and weight of water as compared to that of fuel, the fuel will naturally rise above the water. Over a period of time, a natural fuel/water contact will form at or near the bottom portion of the internal compartment. The fuel/water contact initially forms adjacent to the second opening in the filter housing, below a water sensing means affixed to a wall of the internal compartment adjacent to the second opening. When the fuel/water contact rises adjacent to or above the water sensing means, the water sensing means sends a signal to an auxiliary pump which pumps the separated water from the second opening in the filter housing, until the water sensing means no longer detects the presence of water. Therefore, the fuel/water contact will normally be at or below the water sensing means, which is located below the filter element. The inclusion of a pump to withdraw the separated water from the filter housing is important since the pump draws unfiltered fuel into the filter housing as the separated water is pumped out of the second opening in the filter housing, thereby preventing air from entering the filter housing. The presence of air in the filter housing impedes the egress of fuel from the filter housing and may stall the engine. A filter tube is longitudinally inserted through the longitudinal bore in the filter element to facilitate the egress of filtered and dehydrated fuel from the filter element. The dehydrated and filtered fuel is then pumped upwards through the filter tube. A bias spring means is disposed between and in contact with the base of the bottom filter support and the lower portion of the filter housing. The bias spring means applies pressure to the bottom filter support to prevent the inflow of unfiltered and hydrated fuel into the filter tube, thereby bypassing the filter element.

BRIEF DESCRIPTION OF THE DRAWINGS

The accompanying drawings which are incorporated in and constitute a part of the specification illustrate a preferred embodiment of the invention and together with the general description of the invention given above and the detailed description of the preferred embodiment given below, serve to explain the principals of the invention.

FIG. 4a is a plan view of the top internal collar of the present invention;

FIG. 4b is a cross sectional view of the internal collar of the present invention;

FIG. 5a is a plan view of the top filter support of the present invention;

FIG. 5b is a cross sectional view of the top filter support of the present invention;

DETAILED DESCRIPTION OF THE PREFERRED EMBODIMENT

Reference will now be made in detail to the present preferred embodiment of the invention as described in the accompanying drawings.

Figure 1:
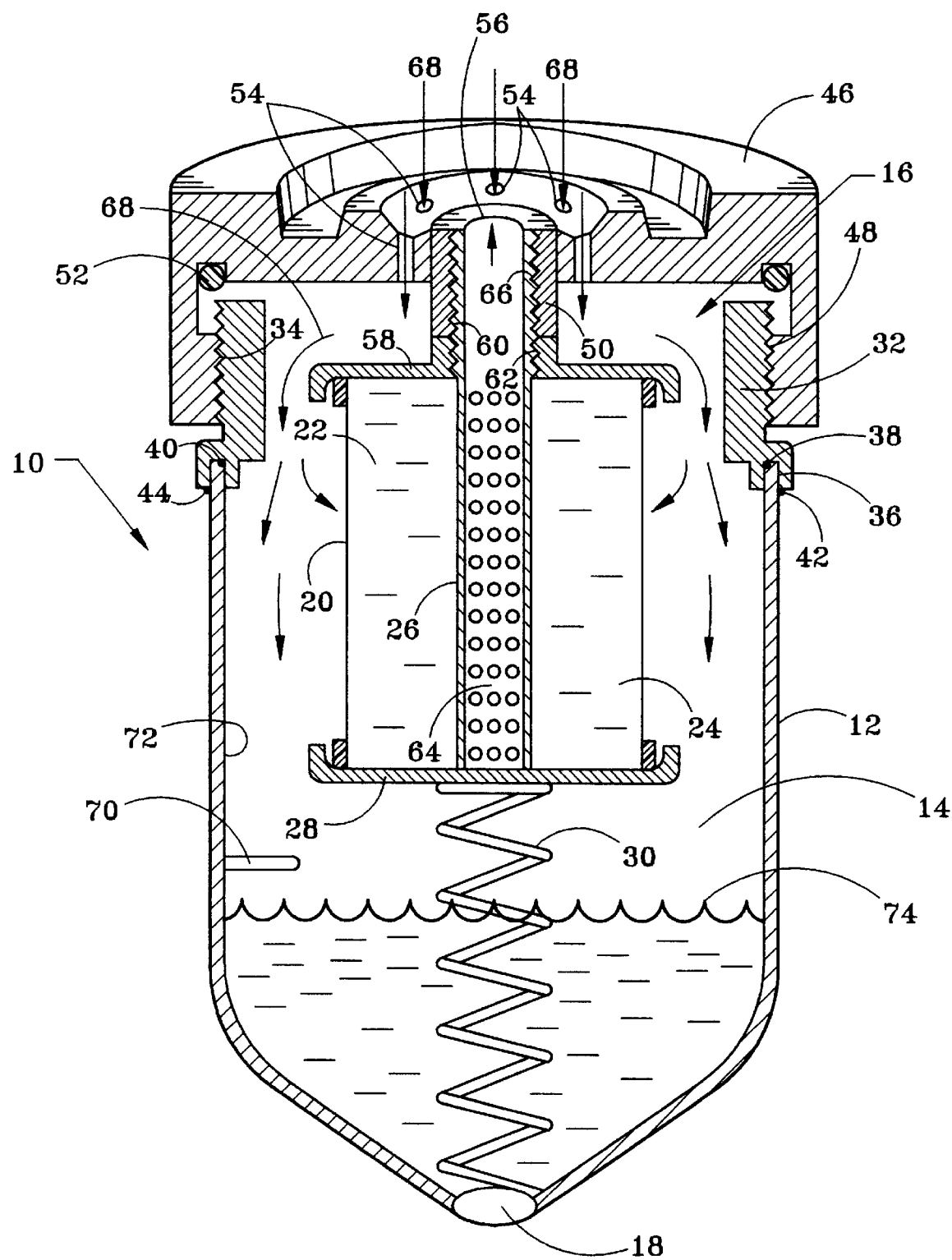
FIG. 1 is a cross sectional view of the preferred embodiment of the filter and dehydrator apparatus encompassed by the present invention.
Figure 2A:
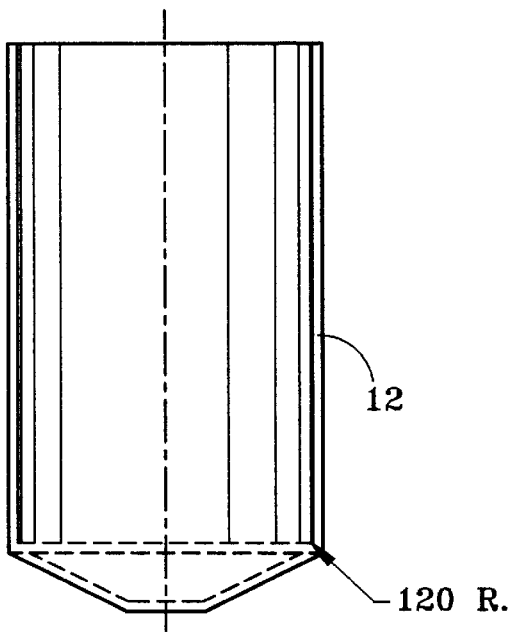
FIG. 2a is cross sectional view of the filter housing.
Figure 2B:
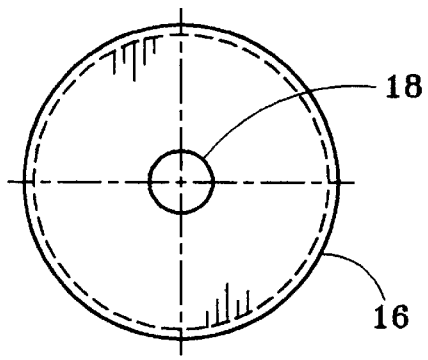
FIG. 2b is a plan view of the filter housing looking through the first opening.
Figure 3B:
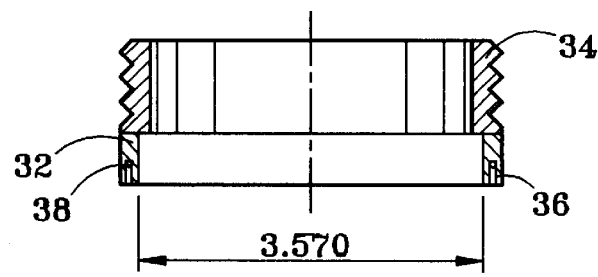
FIG. 3b is a cross sectional view of the filter cap of the present invention.
Figure 3A:
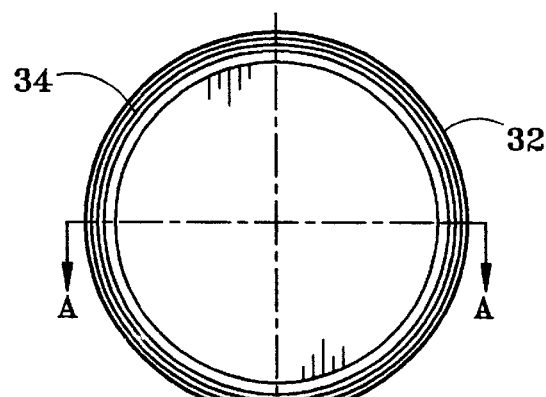
FIG. 3a is a plan view of the filter cap of the present invention.
Figure 6A:
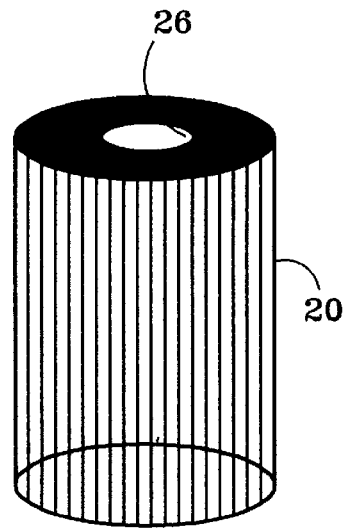
FIG. 6a perspective view of the filter element of the present invention.
Figure 6B:
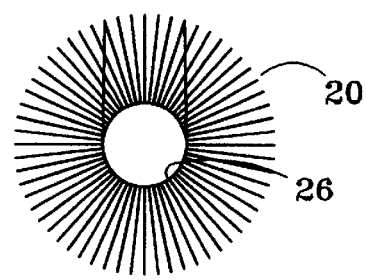
FIG. 6b is plan view of the filter element of the present invention.
Figure 7B:
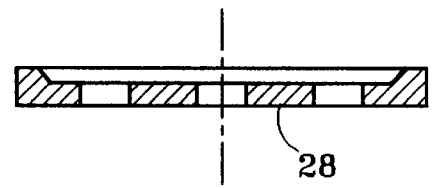
FIG. 7b is a cross sectional view of the bottom filter support of the present invention.
Figure 7A:
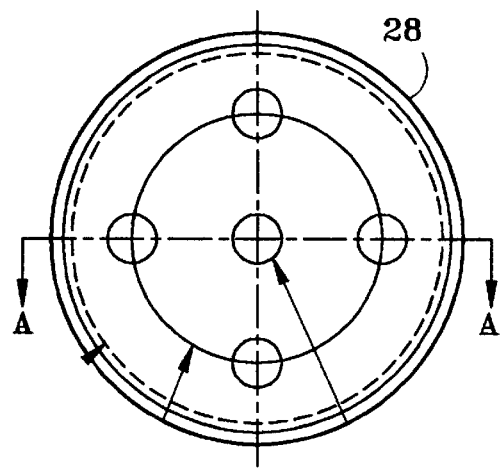
FIG. 7a is a plan view of the bottom filter support of the present invention.
Figure 8A:
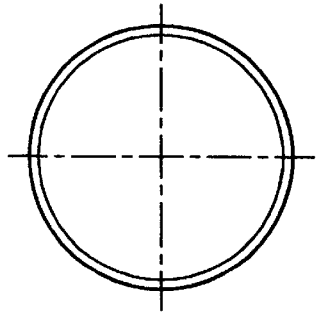
FIG. 8a is a plan view of the filter tube of the present invention.
Figure 8B:
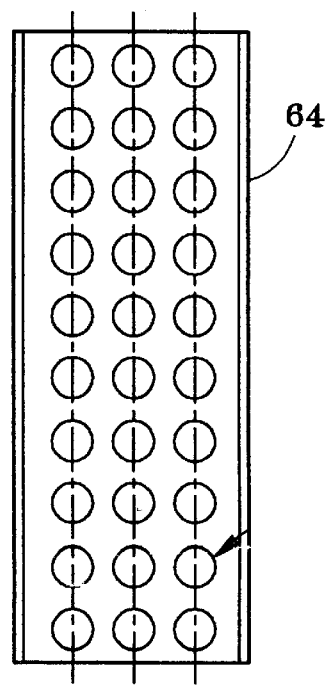
FIG. 8b is a front view of the filter tube of the present invention.
Figure 8C:
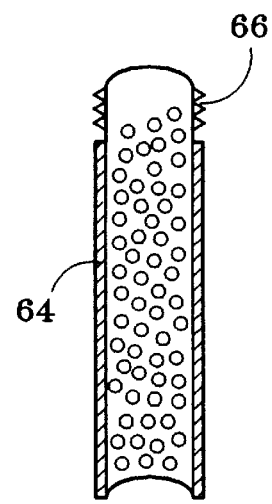
FIG. 8c is a front view of an alternate embodiment of the filter tube of the present invention.

FIG. 1 is a cross sectional view of the filter and dehydrator apparatus 10, illustrating a filter housing 12, further detailed in FIGS. 2A and 2B having an internal compartment 14, a first opening 16 and a second opening 18. The filter and dehydrator apparatus 10 further includes a filter element 20, as detailed in FIGS. 6A and 6B, having a top portion 22, a bottom portion 24 and a longitudinal bore 26. The filter element 20 is mounted in a longitudinal manner and concentric with the filter housing 12. The filter and dehydrator apparatus 10 further includes a bottom filter support 28, as shown in FIGS. 7A and 7B, which supports and is in contact with the bottom portion 24 of the filter element 20. The bottom filter support 28 is supported by a bias spring member 30 which is disposed between the bottom filter support 28 and the filter housing 12 adjacent the second opening 18. A filter cap 32, detailed in FIGS. 3A and 3B, having a set of outwardly facing fastening threads 34 and a circumferential groove 36 is affixed to the filter housing 12 adjacent to the first opening 16. The groove 36 has a diameter slightly greater than the diameter of the first opening 16 of the filter housing 12. The groove 36 retains a first o-ring 38 which forms a first seal 40 when the filter housing 12 adjacent the first opening 16 is inserted into the groove 36 for fixed engagement. Preferably, a bead of solder 42 is welded between the filter housing 12 and the filter cap 32 to form a second seal 44 between the filter housing 12 and the filter cap 32. An internal filter collar 46, detailed in FIGS. 4A and 4B, having a first set of inwardly facing fastening threads 48 and second set of inwardly facing fastening threads 50 is threadably engaged to the filter cap 32, by engaging the fastening threads 34 of the filter cap with the first set of fastening threads 48 of the internal filter collar 46. The internal filter collar 46 preferably includes a second o-ring 52 which forms a seal between the internal filter collar 46 and the filter cap 32. The internal filter collar 46, includes a plurality of fluid inlet openings 54 and at least one fluid outlet opening 56. A top filter support 58, as detailed in FIGS. 5A and 5B, having a concentric longitudinal bore 60 is laterally positioned within the interior of the filter housing 12 and secures the top portion 22 of the filter element 20. The top filter support 58 includes a first set of inwardly facing fastening threads 62 affixed to the bore 60. A filter tube 64 is longitudinally inserted through the outlet opening 56 in the internal filter collar 46. The filter tube 64, as detailed in FIGS. 8A–C, includes a plurality of outwardly facing fastening threads 66 wherein the fastening threads 66 of the filter tube 64 engage the fastening threads 50 of the internal filter collar 46 to secure the filter tube 64 in place. The fastening threads 62 of the top filter support 58 engage the fastening threads 66 of the filter tube 64 to secure the top filter support 58 to the filter tube 64.

With the components of the filter and dehydrator apparatus 10 fully assembled, a fuel material 68 may be feed into the inlet openings 54, wherein the internal cavity 14 of the filter housing 12 fills with the fuel material 68. A water sensing means 70 is affixed to an inner surface 72 of the filter housing 12 between the bottom filter support 28 and the second opening 18 of the filter housing 12. The water sensing means 70, may for example be a water detecting probe, sensitive to the conductivity of water.

Over a period of time, some portion of water insitu with the fuel material 68 will settle in the interior compartment 14 of the filter housing 12 and a fuel/water contact 74 soon develops. Due to the specific gravity and density of water, water will always settle below the fuel, thus fuel will always float on top of water and the insitu water will be separated from the fuel 68. When the fuel/water contact 74 reaches the water sensing means 70 an electronic signal will be generated and sent to an auxiliary pump (not shown) in communication with the second opening 18 of the filter housing 12, which will engage the auxiliary pump and an amount of separated water will be automatically drawn from the second opening 18, thereby lowing the fuel/water contact 74 beneath the water sensing means 70 and well beneath the filter element 20. The inclusion of the auxiliary pump to draw water from the second opening 18 is significant since pumping the separated water from the second opening 18 simultaneously draws unfiltered fuel material 68 into the filter housing 12, thereby preventing air from entering the filter housing 12. The presence of air in the filter housing 12 is detrimental to the egress of filtered fuel 68 from the filter housing 12 and may cause the engine (not shown) to stall.

The filter element 20 is made of disposable and environmentally safe materials which are impervious to water, i.e. celluous silicone treated paper or similar types of material which facilitate the filtration of fuels but prevent the passage of water. By constructing the filter element 20 of environmentally safe, non-metallic materials, the expended filter element 20 may be disposed of without incurring additional costs associated with extracting metals and other environmentally unsafe materials. Further, the expended filter elements 20 of the present invention may have application for plastics and cogeneration fuel usage.

The present invention overcomes the inherent problems associated with disposing of expended filter elements 20 used for filtering and dehydrating fuels, and the like, wherein the insitu water is separated from the fuel and the separated water is disposed of automatically in the absence of allowing air to enter the filter housing 12.

What is claimed is:

1. A filter and dehydrator apparatus for dehydrating and separating impurities from fuel, comprising:

a filter housing having an internal compartment, a first opening and a second opening ;

a filter element having a concentric, longitudinal bore, a top portion and a bottom portion, the filter element being mount ed within the filter housing;

a bottom filter support laterally affixed within the filter housing for contact with the bottom portion of the filter element and support of the filter element;

a top filter support having a concentric longitudinal bore and laterally affixed within the filter housing for securing the top portion of the filter element;

a filter cap affixed to the first opening of the filter housing;

a collar having a concentric, longitudinal bore and a plurality of longitudinal passages to facilitate ingress of fuel into the filter housing, the collar, filter cap and top filter support defining a first opening for receiving the fuel ingesting via the plurality of longitudinal passages in the collar the ingressing fuel flowing from the passages into an internal cavity defined between the filter housing and the filter element;

a water sensor mounted on an internal wall surface of the internal compartment of the filter housing for detecting the presence of water and generating a signal in response thereto, the sensor providing for the removal of water from the filter housing through the second opening while simultaneously unfiltered fuel continues to be drawn into the filter housing through the first opening, thus not allowing air into the filter housing due to the displacement of fuel and impurities therein; and a filter tube longitudinally inserted through the bore of the collar, the bore of the top filter support and the bore of the filter element for direct contact with the filter element, the filter tube to facilitate the egress of filtered and dehydrated fuel from the filter housing.

* * * * *